United States Patent [19]

Haak

[11] 4,355,912

[45] Oct. 26, 1982

[54] SPRING LOADED SENSOR FITTING

[76] Inventor: Raymond L. Haak, Rte. 3, Box 293, Alta Loma, Tex. 77510

[21] Appl. No.: 186,549

[22] Filed: Sep. 12, 1980

[51] Int. Cl.[3] .............................................. G01K 1/14
[52] U.S. Cl. .................................................... 374/208
[58] Field of Search ............................... 73/362.1, 374

[56] References Cited

U.S. PATENT DOCUMENTS

| | | | |
|---|---|---|---|
| 2,135,078 | 11/1938 | Hubbard et al. | 73/362.1 X |
| 2,161,432 | 6/1939 | Rees | 73/374 X |
| 2,302,640 | 11/1942 | Schmidt | 73/374 |
| 2,343,242 | 3/1944 | Richmond | 73/374 X |
| 3,433,074 | 3/1969 | Kautz | 73/374 X |

Primary Examiner—Anthony V. Ciarlante
Assistant Examiner—Joseph W. Roskos
Attorney, Agent, or Firm—Browning, Bushman, Zamecki & Anderson

[57] ABSTRACT

An apparatus is disclosed for obtaining improved heat sensing or temperature measurements using a spring loaded sensor fitting. The apparatus comprises four components in combination being a double ended threaded body; a cylindrical member having adjustable means; an internal compression spring; a retaining threaded member insertion in one end of said body for the purpose of retaining said spring among other useful functions.

4 Claims, 2 Drawing Figures

SPRING LOADED SENSOR FITTING

This invention provides a novel device for obtaining improved temperature measurements and temperature sensing by means of a sensor that is spring-loaded. The elements of the device comprise a double ended threaded body for attaching to the process to be measured on one end and the instrument for interpretation of the sensor on the opposite end; an internal cylindrical member having adjustable means for attachment to said sensor sheath; an internal compression spring member having suitable spring rate for exerting force on sensor in the direction of the temperature point to be monitored; a retaining threaded member for provided a constraint for said spring.

BRIEF DESCRIPTION OF THE DRAWING

In the accompanying drawing forming a part of this application.

BACKGROUND OF THE INVENTION

Figure 1:
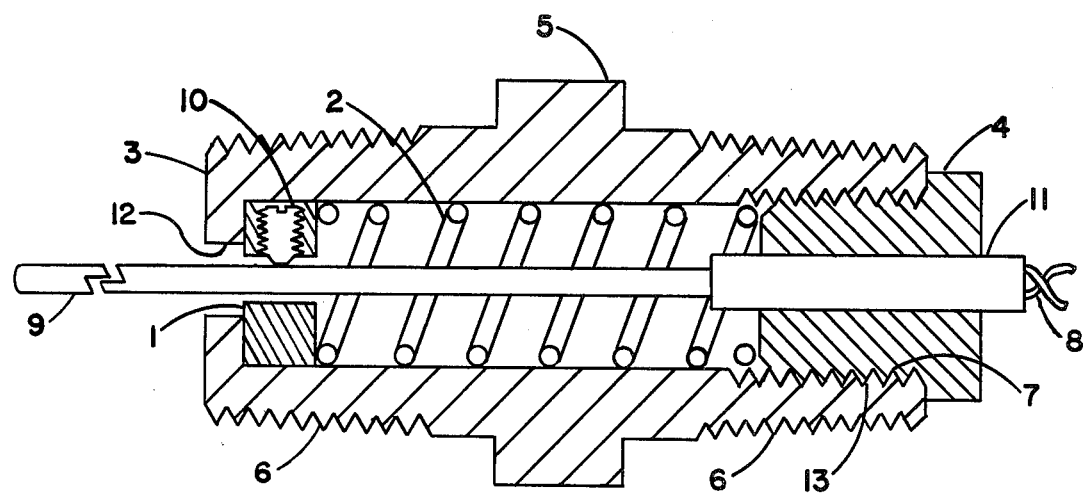
FIG. 1 is a cross-sectional view of apparatus and illustrates assembled device.

When temperature measurements are required of a fluid that is highly corrosive or under elevated pressure, an isolating well is usually employed rather than immersing the temperature sensor directly in the fluid to be measured. Because an isolating well adds thermal time lag and thermal resistance, hence measurement deviation from true value, it is important that a good contact be maintained between the heat sensing tip of the sensor and the inside bottom of the isolating well. The prior art springloaded devices are either weak and flimsy assemblies that are prone to slipping from originally set positions and losing the required tension or they are permanently welded assemblies that are expensive and must be discarded and cannot be reused once the primary sensor fails.

The present invention provides an apparatus that eliminates loss of tension between the sensor and the isolating well due to slippage and also provides a device that can be easily removed and reinstalled on another heat sensor or similar device. In addition, the actual insertion length or immersion depth can be easily adjusted to accommodate varying depth requirements for heat sensing.

DESCRIPTION OF THE INVENTION

Accordingly, it is a primary object of this invention to provide an apparatus for reliably supplying spring tension between an isolating well and a heat sensing device. In addition, an added advantage is the ability to easily adjust the insertion depth to varying requirements and also to provide an apparatus that can be removed from a heat sensor that has failed and reuse the apparatus on a new heat sensor.

The apparatus of the invention which is intended to be used in the use and installation thereof of heat sensors and primarily in combination with isolating wells is comprised of:

a. double ended male threaded body for attaching to internally threaded conduit members or similar devices having matching threads. Additionally body has internal threads on one end.

b. cylindrical member for insertion inside said body and having integral adjustable means for attaching said cylinder to heat sensor sheath.

c. internal compression spring for exerting a force on said cylindrical member which in turn produces a force on said heat sensor in the direction of heat sensitive tip.

d. retaining threaded member having external threads that match internal threads to said double ended threaded body The threaded, double ended body portion of the apparatus may be cnstructed out of any desirable material having the required threads and also suitable mechanical and thermal properties suitable for the specific or intended use. This body member may be internally bored to accommodate the insertion of the movable cylindrical member having adjustable means. This internal bore or opening shall also accommodate the insertion of a compression spring having the desired spring rate and having an outside diameter sufficiently smaller than said internal bore diameter.

The cylindrical member may be constructed of a suitable material having mechanical and thermal properties suitable for the specific or intended use. The said cylindrical member shall have an outside diameter such that it shall pass easily through the internal opening of aforementioned body with the longitudinal axis of said cylinder coinciding with the longitudinal axis of aforementioned body member. Said cylindrical member shall have an opening bored through the center of said member and perpendicular the surface of ends of said member. This bored opening shall be of proper size sufficiently larger than intended sensing probe such that intended sensing probe shall easily pass through this opening without difficulty. Said cylindrical member shall additionally contain adjustable threaded means, parallel to radius of said cylinder and perpendicular to longitudinal axis of intended sensing probe, that is, once the cylindrical member is placed in the desired location, this adjustable threaded member shall prevent motion between said cylindrical member and intended sensing probe.

The compression spring may be constructed of a suitable material having mechanical and thermal properties suitable for the specific or intended use. Said spring shall have an outside diameter adequately small enough to easily pass inside of aforementioned internal bore opening of body member. Additionally, said spring shall have internal opening or bore diameter such that the desired sensing probe shall easily pass through spring when longitudinal axis of sensing probe and longitudinal axis of spring coincide.

The retaining threaded member may constructed of a suitable material having mechanical and thermal properties suitable for the specific or intended use. Said retaining member shall have external threads on a portion of its exterior that are compatible with internal threads located on one end of aforementioned double ended body. Said retaining member shall additionally have internally bored opening of sufficient inside diameter to allow easy passage of desired sensing probe.

DESCRIPTION OF THE PREFERRED EMBODIMENT

FIG. 1 shows a cross-sectional view of the apparatus and its individual members thereof to illustrate a preferred apparatus according to the present invention. The heat sensitive end of the sensing probe 9 is also considered the process end and the opposite end of the sensing probe is called the terminal end 8. The apparatus is shown assembled to a sensing probe with the retaining member 4 on the terminal end. Assembly of apparatus to a sensing probe in this fashion facilitates removal and replacement of the sensing probe without removing apparatus body 3. The apparatus may, however be assembled in a reverse order to that shown should this prove to be advantageous. The cylindrical member 1 with adjustable means 10 is positioned to its desired location and the adjustable means 10, or setscrew is tightened to prevent motion between sensing probe 9 and cylindrical member or collar 1. Compression spring 2 is placed over the leads or termination wires 8, slid over transition piece 11 until spring comes to rest against collar 1. The retaining member 4 is likewise placed over the termination leads 8 and is moved along sensing probe until retaining member 4 comes into contact with compression spring 2. The double-ended body 3 is placed over the sensing probe by placing the heat sensitive end 9 of probe through the internally threaded end 7 of the body 3. The heat sensitive end 9 continues through the opening 12 of the body 3. The retaining member 4 is moved forward until external threads 13 engage matching internal threads 7 of body 3. Retaining member 4 is held rigid while the body 3 is rotated to fully engage all of the threads 13 on retaining member 4. Due to proper selection of the free length of spring 2, the retaining member 4 slightly compresses spring 2 which forces collar 1 against the should formed adjacent opening 12 and holds it there under compression. The double ended external threads 6 are normally ½ inch NPT for engaging in a standard thermowell on the process end and an instrument head or connection head on the terminal end. The retaining member 4 and the double ended body 3 are usually machined from hex barstock which will leave flat surfaces 5 as shown on body 3. These flat surfaces facilitate the use of tools for installation and removal of apparatus.

Figure 2:
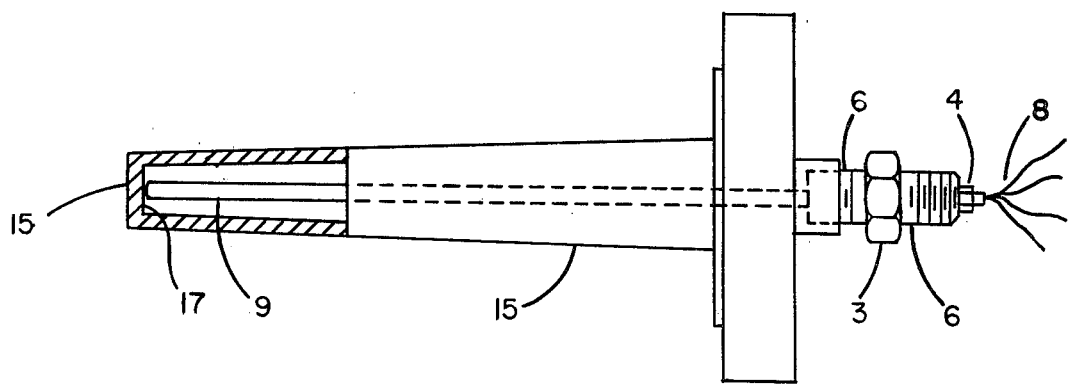
FIG. 2 is a typical application involving this invention installed in a thermowell for industrial temperature measurement.

FIG. 2 shows the heat sensitive probe 9 installed in a thermowell 15. The termination leads 8 pass through retaining member 4 which is installed in body 3. The threads 6 are engaged in thermowell to standard acceptable engagement. Normally the sensing probe 9 is installed in apparatus 3 approximately ¼ inch to ¾ inch longer than the internal depth of thermowell 15. This will insure that the heat sensitive end of sensing probe 9 will engage the inside bottom 17 of thermowell 15 before the threads 6 of apparatus 3 are fully engage which causes the compression spring to compress and maintain a constant force between the sensing probe tip and inside thermowell bottom 17.

Obviously, other modifications and variations of the present invention are possible in the light of the above disclosure. It is, therefore, to be understood that changes may be made in the particular embodiments of the invention described which are within the full intended scope of the invention as defined by the appended claims.

I claim:

1. An improved spring-loaded apparatus for use with a heat sensor and in combination with isolating or thermal wells comprising:
 a double ended male threaded body for attaching to an internally threaded conduit member, said threaded body having an internally bored hole with female threads on one end;
 a cylindrical member located within said internally bored hole in said threaded body, said cylindrical member having adjustable means for selectively rigidly attaching said cylindrical member to said heat sensor at different positions along the length of said sensor;
 an internal compression spring having outside diameter less than the diameter of said internally bored hole in said threaded body, said spring positioned within said threaded body so as to exert a force on said cylindrical member;
 a retaining threaded member having external threads on one end, said external threads mating with said female threads on said threaded body.

2. An apparatus as defined in claim 1 wherein said threaded body is symmetrical in construction with flat sides in the center section of said body.

3. An apparatus as defined in claim 1 wherein said retaining threaded member has external threads on one end and flat sides on the opposite end.

4. The apparatus of claim 1 wherein said adjustable means on said cylindrical member is a set screw.

* * * * *